(12) United States Patent
Sumcad

(10) Patent No.: US 12,540,829 B2
(45) Date of Patent: Feb. 3, 2026

(54) PARKING PROTECTION SYSTEM

(71) Applicant: GM Global Technology Operations LLC, Detroit, MI (US)

(72) Inventor: Anthony J. Sumcad, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 88 days.

(21) Appl. No.: 18/412,822

(22) Filed: Jan. 15, 2024

(65) Prior Publication Data

US 2025/0231040 A1 Jul. 17, 2025

(51) Int. Cl.
*G06F 3/048* (2013.01)
*G01C 21/36* (2006.01)
*G08G 1/14* (2006.01)

(52) U.S. Cl.
CPC ......... *G01C 21/3685* (2013.01); *G08G 1/145* (2013.01)

(58) Field of Classification Search
CPC .............................. G01C 21/3685; G08G 1/145
See application file for complete search history.

(56) References Cited

U.S. PATENT DOCUMENTS

| | | | | |
|---|---|---|---|---|
| 10,997,859 | B2* | 5/2021 | Lee | G08G 1/144 |
| 11,835,355 | B2* | 12/2023 | Higuchi | G08G 1/143 |
| 12,094,339 | B2* | 9/2024 | Roherty | G06F 16/29 |
| 12,128,878 | B1* | 10/2024 | Funke | G08G 1/146 |
| 12,175,392 | B2* | 12/2024 | Morrow | G06N 5/04 |
| 2016/0140845 | A1* | 5/2016 | Agrawal | G08G 1/148 |
| | | | | 340/932.2 |
| 2022/0027801 | A1* | 1/2022 | Friedman | G05D 1/228 |
| 2022/0136855 | A1* | 5/2022 | Higuchi | G08G 1/146 |
| | | | | 701/533 |
| 2022/0350994 | A1* | 11/2022 | Yang | B60W 30/06 |
| 2023/0349715 | A1* | 11/2023 | Fei | G06F 18/23213 |
| 2024/0255296 | A1* | 8/2024 | Li | G01C 21/3476 |
| 2024/0361137 | A1* | 10/2024 | Aviv | B60L 58/12 |
| 2025/0035459 | A1* | 1/2025 | Saney | G01C 21/365 |

* cited by examiner

*Primary Examiner* — David Phantana-angkool
(74) *Attorney, Agent, or Firm* — Honigman LLP; Matthew H. Szalach; Jonathan P. O'Brien

(57) ABSTRACT

A parking protection system includes data processing hardware and memory hardware in communication with the data processing hardware. The memory hardware stores instructions that, when executed on the data processing hardware, cause the data processing hardware to perform operations. The operations include predicting an event based on event data, determining, based on the predicted event, protective attributes, determining an availability and a capacity of one or more parking areas, and providing a route to a parking area based on the protective attributes and the determined availability and capacity.

20 Claims, 5 Drawing Sheets

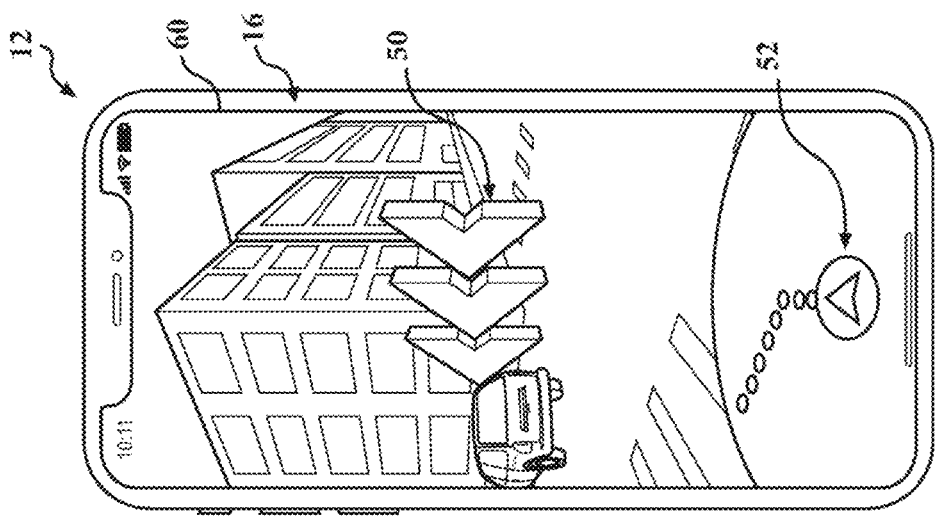
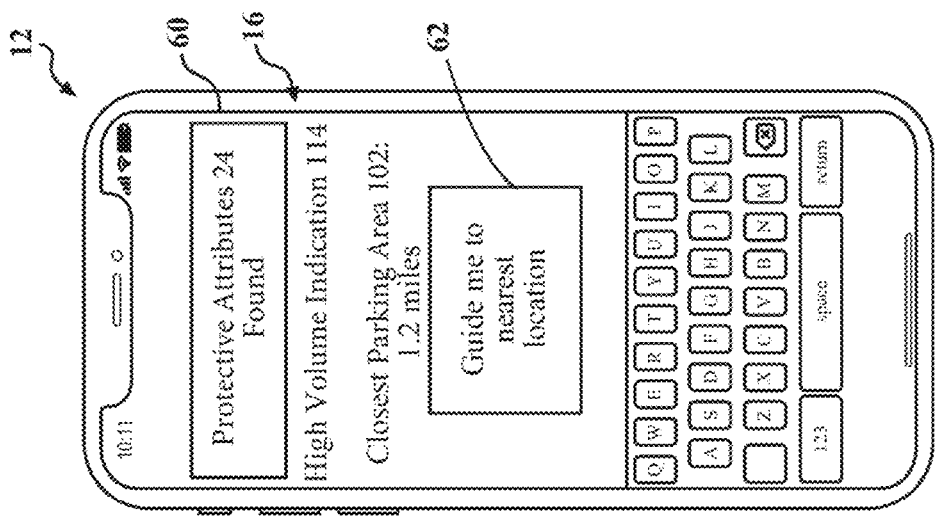
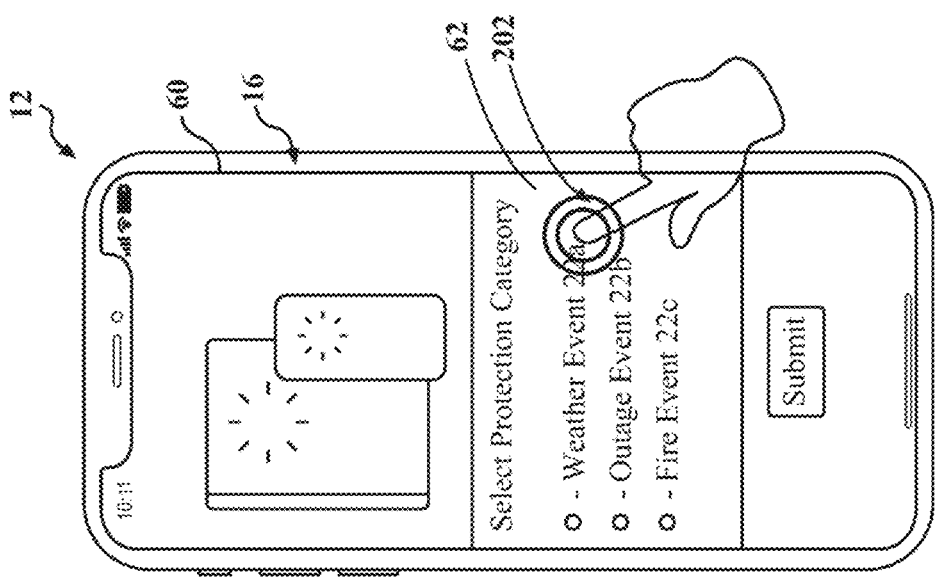
FIG. 4C
FIG. 4B
FIG. 4A

PARKING PROTECTION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a parking assist system for a vehicle.

Vehicles are impacted by naturally occurring events, such as weather, in addition to events that may impact use of the vehicle. For example, electric vehicles (EV) may be particularly susceptible to power or grid outages. While some users may routinely store vehicles in a covered garage, which may avoid some weather-related events, vehicles are often left uncovered. In particular, users that reside in a city typically utilize street parking when weather conditions do not warrant seeking covered parking. When a user elects to store a vehicle in covered parking, such as a parking garage, the user may be unaware of capacity levels and what features the covered parking may offer. Thus, users often face the problem of insufficient vehicle protection and readily identifying availability of nearby covered parking.

SUMMARY

In some aspects, a computer-implemented method when executed by data processing hardware causes the data processing hardware to perform operations. The operations include predicting an event based on event data, determining, based on the predicted event, protective attributes, and receiving an input corresponding to at least one of the protective attributes. The operations also include obtaining protective attribute data in response to the received input, determining an availability and a capacity of one or more parking areas, and providing a route to a parking area based on the protective attribute data and the determined availability and capacity.

In some examples, the operations may include categorizing the event in a protection category, the protection category including at least one of a weather event, an outage event, and a fire event. Optionally, determining the availability and the capacity may include determining a low volume of one or more of the parking areas and issuing, in response to the determined low volume, a low volume indication. In other examples, determining the availability and the capacity may include determining a high volume of one or more of the parking areas and issuing, in response to the determined high volume, a high volume indication. Providing the route may include determining the route based on the high volume indication. The operations may include reserving a spot in the parking area via a reservation system. Optionally, obtaining the protective attribute data includes comparing the protective attribute data with the received input corresponding to at least one of the protective attributes.

In another aspect, a parking protection system includes data processing hardware and memory hardware in communication with the data processing hardware. The memory hardware stores instructions that, when executed on the data processing hardware, cause the data processing hardware to perform operations. The operations include predicting an event based on event data, determining, based on the predicted event, protective attributes, determining an availability and a capacity of one or more parking areas, and providing a route to a parking area based on the protective attributes and the determined availability and capacity.

In some examples, the operations may include categorizing the event in a protection category, the protection category including at least one of a weather event, an outage event, and a fire event. Optionally, determining the availability and the capacity may include determining a low volume of one or more of the parking areas and issuing, in response to the determined low volume, a low volume indication. In other examples, determining the availability and the capacity may include determining a high volume of one or more of the parking areas and issuing, in response to the determined high volume, a high volume indication. Providing the route may include determining the route based on the high volume indication. The operations may include reserving a spot in the parking area via a reservation system. Optionally, obtaining the protective attribute data includes comparing the protective attribute data with the received input corresponding to at least one of the protective attributes.

In further aspects, a parking protection system includes a back office server including a parking area database and a network communicatively coupled with the back office server. A user device includes a display and data processing hardware in communication with the display and communicatively coupled with the back office server via the network. The data processing hardware includes a parking protection application configured with a protection protocol, and the parking protection application is configured determine one or more protection categories based on a predicted event. The data processing hardware is configured to receive at least one of capacity data and availability data of one or more parking areas from the parking area database and, in response, is configured to generate a route to at least one of the parking areas.

In some examples, the parking area database may include protective attribute data. The user device may be configured to receive an input at the display corresponding to one or more protective attributes of the parking protection application, and the back office server may be configured to compare the protective attribute data with the one or more protective attributes. Optionally, the parking protection application may include a reservation system configured to reserve a spot, and the user device may include a navigation application configured to execute the generated route to the reserved spot. In some instances, the parking protection system may include a third party server that may be communicatively coupled to at least one of the back office server and the user device via the network. The third party server may include event data including one or more of weather data, outage data, and fire data and may be configured to predict the predicted event based on the event data. A vehicle may be in communication with the parking protection system.

BRIEF DESCRIPTION OF THE DRAWINGS

The drawings described herein are for illustrative purposes only of selected configurations and are not intended to limit the scope of the present disclosure.

FIG. 4A is an example schematic of a user device equipped with a protection protocol according to the present disclosure;

FIG. 4B is another example schematic of the user device of FIG. 4A executing a parking protection application according to the present disclosure;

FIG. 4C is an example schematic of the user device with a route corresponding to the protection protocol.

Corresponding reference numerals indicate corresponding parts throughout the drawings.

DETAILED DESCRIPTION

Figure 1:
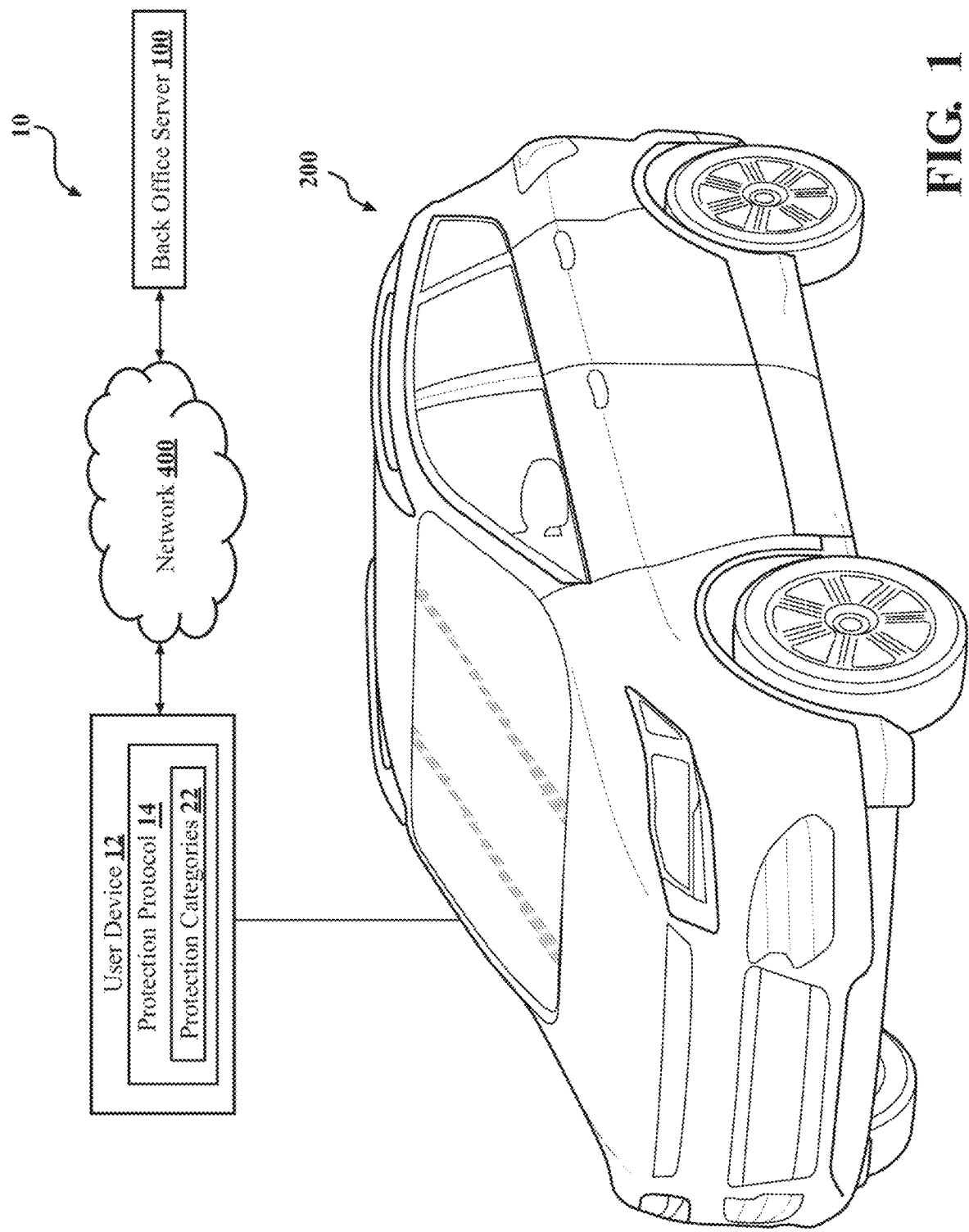
FIG. 1 is a schematic of a vehicle in communication with a user device and a back office server as part of a parking protection system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
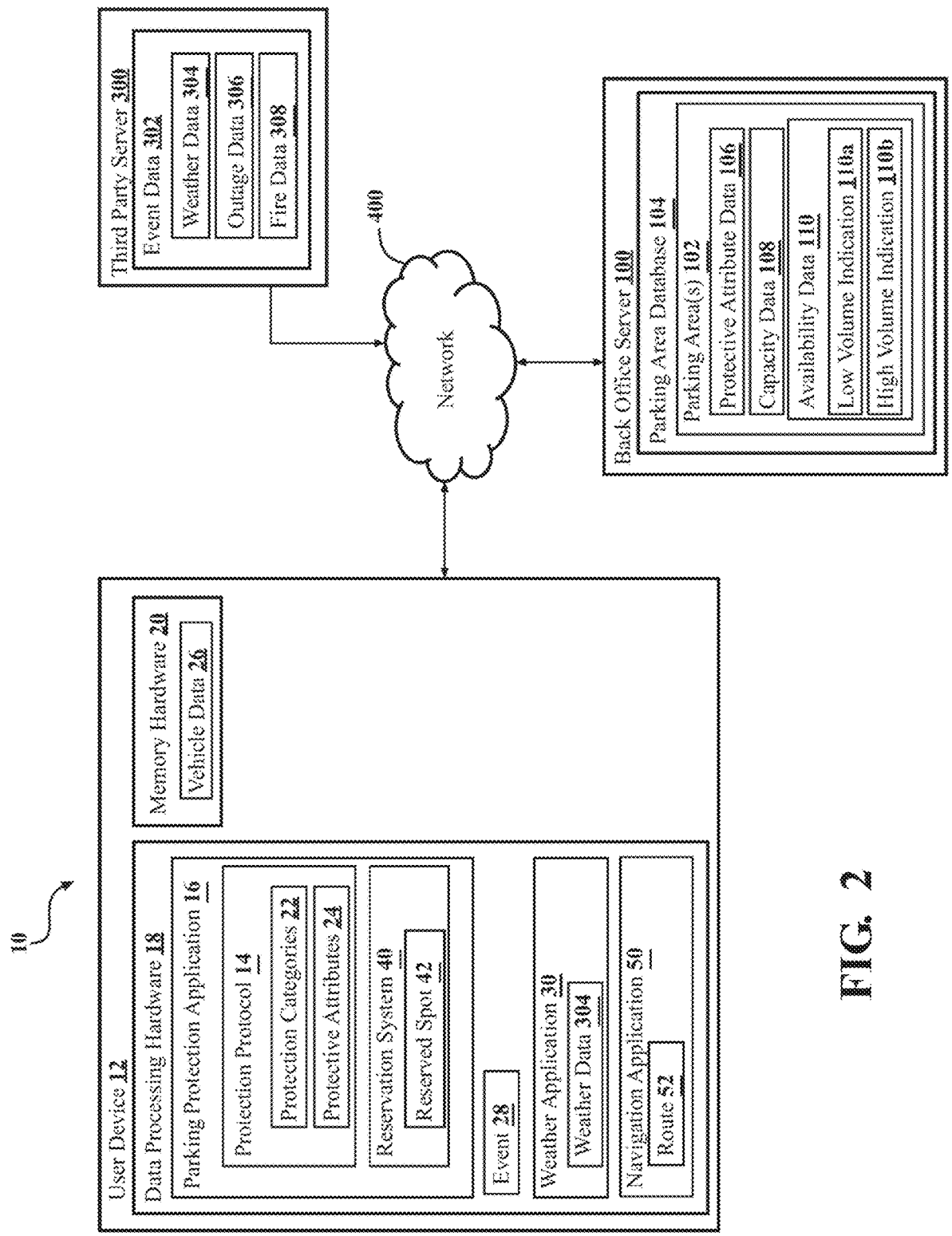
FIG. 2 is an example block diagram for a parking protection system according to the present disclosure.
Figure 3:
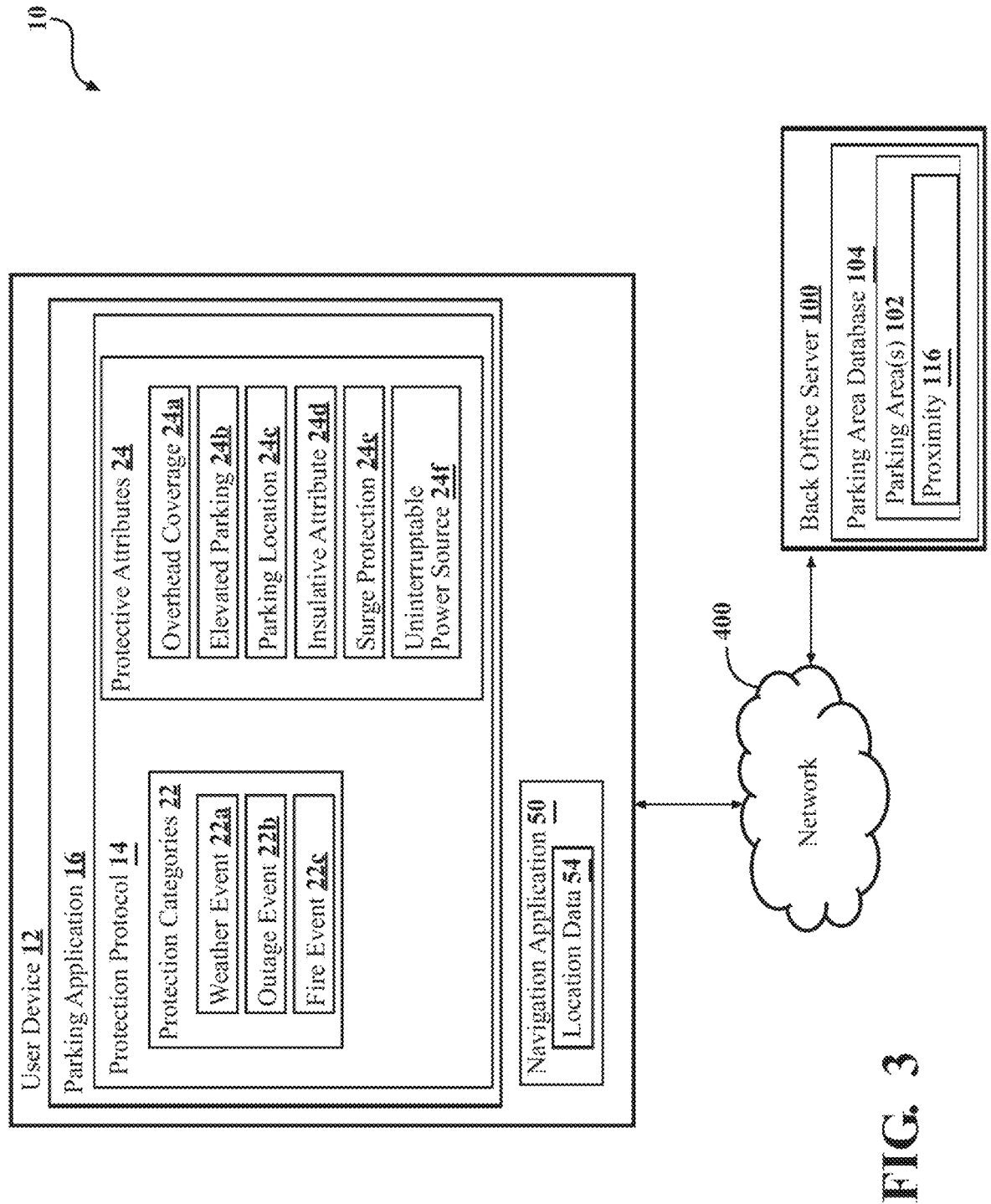
FIG. 3 is another example block diagram for the parking protection system of FIG. 2.

Referring to FIGS. 1-3, a parking protection system 10 includes a user device 12 equipped with a protection protocol 14 of a parking protection application 16 for a vehicle 200. The parking protection system 10 connects the user device 12 with a back office server 100 and a third party server 300 via a network 400. The back office server 100 and the third party server 300 may also be in communication to exchange data, described in detail below. For example, the back office server 100 may receive event data 302 from the third party server 300 and, in response to the event data 302, may prompt the user device 12 with protective attribute data 106. The parking protection system 10 is configured to assist a user to identify one or more parking areas 102 for protective storage of the vehicle 200 in response to a predicted event 28.

The protection protocol is executed by data processing hardware 18 of the user device 12. The user device 12 also includes memory hardware 20 that is in communication with the data processing hardware 18. The memory hardware 20 stores instructions that, when executed on the data processing hardware 18, cause the data processing hardware 18 to perform operations, described herein. The protection protocol 14 is executed by the data processing hardware 18, but may be stored on the memory hardware 20. For example, the protection protocol 14 may be configured with protection categories 22 and protective attributes 24, which may be stored on the memory hardware 20. For purposes of illustration, FIG. 2 illustrates the protection categories 22 and the protective attributes 24 within the protection protocol 14 and being executed by the data processing hardware 18. However, the memory hardware 20 may store each of the protection categories 22 and the protective attributes 24.

The memory hardware 20 may also store vehicle data 26, which may be utilized in selection of one or more of the protective attributes 24. For example, some of the protective attributes 24 may be selected if the vehicle 200 is an electric vehicle (EV) 200, described below. In some instances, the parking protection application 16 may be triggered by the event 28, such that the user device 12 scans for events 28 that may trigger the parking protection application 16. Additionally or alternatively, the parking protection application 16 may have a pull feature, such that the event 28 is pulled from the back office server 100 when the user opens the parking protection application 16.

The protection categories 22 correspond to the event 28 that may be predicted or otherwise determined by the parking protection system 10. In some examples, the event 28 may be predicted by the third party server 300, described below, via crowdsourced data vectoring gathered by the parking protection system 10. The event 28 is categorized into one or more of the protection categories 22 by the parking protection system 10. The protection categories 22 may include, but are not limited to, a weather event 22a, an outage event 22b, and a fire event 22c. In some examples, the weather event 22a may include, but is not limited to, hail, tornados, ice, flooding, landslides, and other weather events that may be notified to a user.

The protection categories 22 generally correspond with the protective attributes 24. For example, if the weather event 22a is selected, then protection attributes 24 associated with the weather event 22a may be prompted or otherwise utilized. The protective attributes 24 correspond with options that the user may select to protect or otherwise shelter the vehicle 200 during the predicted event 28. For example, the protective attributes 24 may include, but are not limited to, overhead coverage 24a, elevated parking 24b, a parking location 24c, an insulative attribute 24d, surge protection 24e, and/or an uninterruptable power source 24f. The parking location 24c may generally correspond to a preferred distance to a parking area 102 from the present location of the vehicle 200. For example, the user may input a distance range that the user would travel to a parking area 102. The back office server 100 may utilize the parking location 24c when identifying one or more of the parking areas 102, as described below. Further, when selecting one or more of the protection categories 22 and the protective attributes 24, the user may optionally turn on or off various categories 22.

While some protective attributes 24 align with the protection categories 22 directly, it is also contemplated that multiple protective attributes 24 may overlap with one or more of the protection categories 22. Further, the user may select a single protective attribute 24, but the parking area 102 may be equipped with multiple protective attributes 24. As described in more detail below, the parking protection application 16 may prompt the user to select, via a user input 202, one or more protection categories 22, which may further prompt the selection of one or more protective attributes 24. Additionally or alternatively, the parking protection application 16 may automatically select the protective attributes 24 based on the selected protection category or categories 22. Upon selection of the respective protection category or categories 22, the protection protocol 14 may automatically select the protective attributes associated with the selected protection category 22. Thus, the selection of the protection category 22 and corresponding protective attribute 24 may be collectively communicated with the back office server 100.

Referring still to FIGS. 1-3, the third party server 300 may predict the event 28 via the event data 302 and communicate the event 28 to the back office server 100. For example, the third party server 300 may include independent internet servers that gather event data 302 to predict the event 28. In some examples, the third party server 300 may utilize crowdsourcing to identify and/or predict the event 28. In other examples, the user device 12 may predict the event 28 via a weather application 30 configured as part of the data processing hardware 18.

For example, the weather application 32 may provide the parking protection application 16 with the weather data 304, which may be utilized to prompt the protection protocol 14. The event data 302 may include, but is not limited to, weather data 304, outage data 306, and/or fire data 308. The weather data 304 may correspond to hail, ice, tornado, landslides, flooding, high winds, snow, heavy rain, and/or any other weather pattern that may be advantageous for the vehicle 200 to be positioned in a fortified overhead parking area or structure 102. The outage data 306 corresponds to events that may result in power outages at the location of the vehicle 200, such that seeking alternative power sources for the vehicle 200 would be advantageous.

In some examples, the vehicle 200 may be an EV 200, in which case it would be advantageous to seek an uninterruptable power source 24f. The fire data 308 generally corresponds to both active and/or recently active fires, which may also include resultant smoke. The event data 302 generally corresponds to each protection category 22. The event 28 is subsequently communicated with the user device 12 via the network 400 to execute the protection protocol 14.

Once the back office server 100 receives the predicted event 28 from the third party server 300, the back office server 100 communicates the predicted event 28 with the user device 12. The back office server 100 awaits feedback from the user device 12 via the protection protocol 14 and may, in some examples, evaluate the predicted event 28. Further, the back office server 100 may independently evaluate the parking area database 104 for protective attribute data 106 that may correspond with the predicted event 28. In some instances, the back office server 100 may automatically evaluate the parking area database 104 in response to the event data 302 received from the third party server 300.

For example, the back office server 100 may identify a broad range of parking areas 102 stored within the parking area database 104 that may have attributes that may be advantageous for the predicted event 28. Once the back office server 100 receives the communication from the user device 12 with the protection category 22 and corresponding protective attributes 24, the back office server 100 can cross-reference the identified parking areas 102 and the respective protective attribute data 106. It is contemplated that the attributes estimated by the back office server 100 may differ from the protective attributes 24 provided as part of the protection protocol 14. Thus, the back office server 100 cross-checks protective attribute data 106 of the respective parking areas 102 with the protective attributes 24 provided.

In other examples, the back office server 100 may communicate the predicted event 28 to the user device 12 and wait for the user input 202 corresponding to one or more of the protection categories 22 and/or the protective attributes 24. The back office server 100 stores protective attributes 24 of corresponding parking areas 102 within the parking area database 104 as the protective attribute data 106. Thus, the back office server 100 may receive the user input 202 corresponding to one or more of the protection categories 22 and/or the protective attributes 24 and evaluate the protective attribute data 106 to identify a parking area 102 that corresponds to the user input 202.

For example, the predicted event 28 may be a weather event 22a in which the user input 202 corresponds to the selection of the weather event 22a protection category 22. The back office server 100 may, in response to the user input 202, evaluate the protective attribute data 106 of various parking areas 102 stored in the parking area database 104. The protective attribute data 106 may include data regarding which parking area(s) 102 include a fortified overhead structure and/or higher ground, such as elevated parking structures. Additionally or alternatively, the protective attribute data 106 may correspond to the parking area 102 being a determined distance away from the predicted event 28. The back office server 100 may present the user with the parking area(s) 102 equipped with the protective attributes 24 in a ranked order to efficiently assist the user in selecting a parking area 102.

In the example of the event 28 corresponding to a fire event 22c, the back office server 100 may identify those parking areas 102 that include protected or otherwise insulated structures equipped with exhaust systems to remove smoke. For example, the parking area 102 may be insulative and located below ground. When the event 28 corresponds to an outage event 22b, the back office server 100 identifies parking areas 102 equipped with an uninterruptable power source 24f such as a capacitive back-up system and/or surge protections in place. In this example, the identified parking area(s) 102 are configured with EV charging capabilities. Identifying parking areas 102 equipped with an uninterruptable power source 24f and surge protection 24e is particularly advantageous for EV and/or autonomous vehicles 200.

With further reference to FIGS. 1-3, the back office server 100 utilizes capacity data 108 and availability data 110 from the parking area database 104 to determine both the relative capacity and availability of the identified parking area(s) 102. Thus, the back office server 100 may first determine the parking area 102 that corresponds with the protection category or categories 22 and each respective protective attribute 24 based on the user input 202. The back office server 100 subsequently determines the availability and capacity of each identified parking area 102. The capacity data 108 corresponds to the overall available space within the parking area 102, and the availability data 110 corresponds to one or more identified, unoccupied and unobstructed parking space(s) within the parking area 102. For example, a parking space may be unoccupied, but may be obstructed by an object or structure that renders the parking space unavailable. The back office server 100 may continuously update the parking area database 104 with the capacity data 108 and the availability data 110 to provide the user device 12 with an up-to-date assessment of the parking areas 102.

The back office server 100 may present the parking areas 102 to the user device 12 in order of protective attribute data 106 and then availability and capacity. In some examples, the back office server 100 generates an indication, based on the availability data 110, corresponding to one of a low volume indication 110a and a high volume indication 110b for each respective parking area 102. It is also contemplated that the back office server 100 may generate the indication with a range of volumes, such as an intermediate volume indication. The low volume indication 110a corresponds to a high capacity and low availability of the respective parking area 102, and the high volume indication 110b corresponds to a low capacity and high availability of the respective parking area 102. For example, the low volume indication 110a corresponds with a parking area 102 that has the protective attributes 24, but has few parking spots readily available. Comparatively, the high volume indication 110b corresponds to a parking area 102 that has at least some of the protective attributes 24 and several available parking spots.

The indications 110a, 110b are configured to assist the user in determining which parking area 102 to select. For example, a parking area 102 may have a high number of the protective attributes 24, but may have a low volume indication 110a. Thus, the user may elect a parking area 102 that may have fewer protective attributes, but has a high volume indication 110b. The back office server 100 determines whether there is a low volume and, if a low volume is determined, issues the low volume indication 110a to the user device 12. Similarly, the back office server 100 determines whether there is a high volume and, if a high volume is determined, issues the high volume indication 110b to the user device 12.

The parking protection application 16 may be equipped with a reservation system 40 to identify and secure a reserved spot 42. For example, the user device 12 may receive the low volume indication 110a for a parking area 102 that includes a high number of the protective attributes 24 that may be advantageous based on the predicted event 28. The user may utilize the reservation system 40 to identify an available spot and reserve the spot 42. Thus, the user may be able to utilize the parking area 102 with the most protective attributes 24 for the predicted event 28, regardless of the volume indication 110a, 110b. In another example, the user may utilize the reservation system 40 to reserve a spot 42 at a parking area 102 nearest to the location of the user and vehicle 200. The user device 12 may also be equipped with a navigation application 50 that may generate a route 52 to the reserved spot 42 and/or the parking area 102 in general. The route 52 is provided to the user on the user device 12 and may be determined based on the high volume indication 110b.

Referring now to FIGS. 2-4C, the user device 12 may project each of the decisions on a display 60 of the user device 12. For example, FIG. 4A illustrates the parking protection application 16 displaying the various protection categories 22 based on the predicted event 28. The user, via the user input 202, selects one or more of the protection categories 22 and corresponding protective attributes 24. The user input 202 corresponding to each selection is communicated with the back office server 100 via the network 400, and the back office server 100 identifies one or more parking areas 102 corresponding to the user input(s) 202. The back office server 100, in identifying parking areas 102, accounts for the proximity 116 of each parking area 102 to a current location of the vehicle 200. For example, one of the protective attributes 24 may include a parking location 24c, such that the user may select to have a parking area 102 with a proximity 116 to a current location of the vehicle 200. Additionally or alternatively, the parking location 24c may correspond to a parking area 102 with a proximity 116 close to a home base of the user and vehicle 200. The proximity 116 relative to the vehicle 200 may be determined by the back office server 100 via location data 54 received from the navigation application 50 of the user device 12.

The user device 12 may generate a notification 62 using the parking protection application 16 and project the notification 62 on the display 60. The notification 62 is configured to notify the user that the back office server 100 has identified one or more parking areas 102 with the protective attributes 24 selected. The notification 62 may also provide the user with the option to generate a route 52 to the parking area 102. In some examples, the notification 62 may include the option to execute the reservation system 40 to reserve a spot 42. Thus, the route 52 may direct the user to the reserved spot 42 in some examples. If the user selects to generate the route 52, the user device 12 may display the route 52 using the navigation system 50 on the display 60. It is also contemplated that the user device 12 may project the route 52 onto an infotainment center of the vehicle 200. The route 52 may include turn-by-turn directions, a map, and street views of the route 52 to assist the user in navigating to the parking area 102 and identifying landmarks near the parking area 102.

Figure 5:
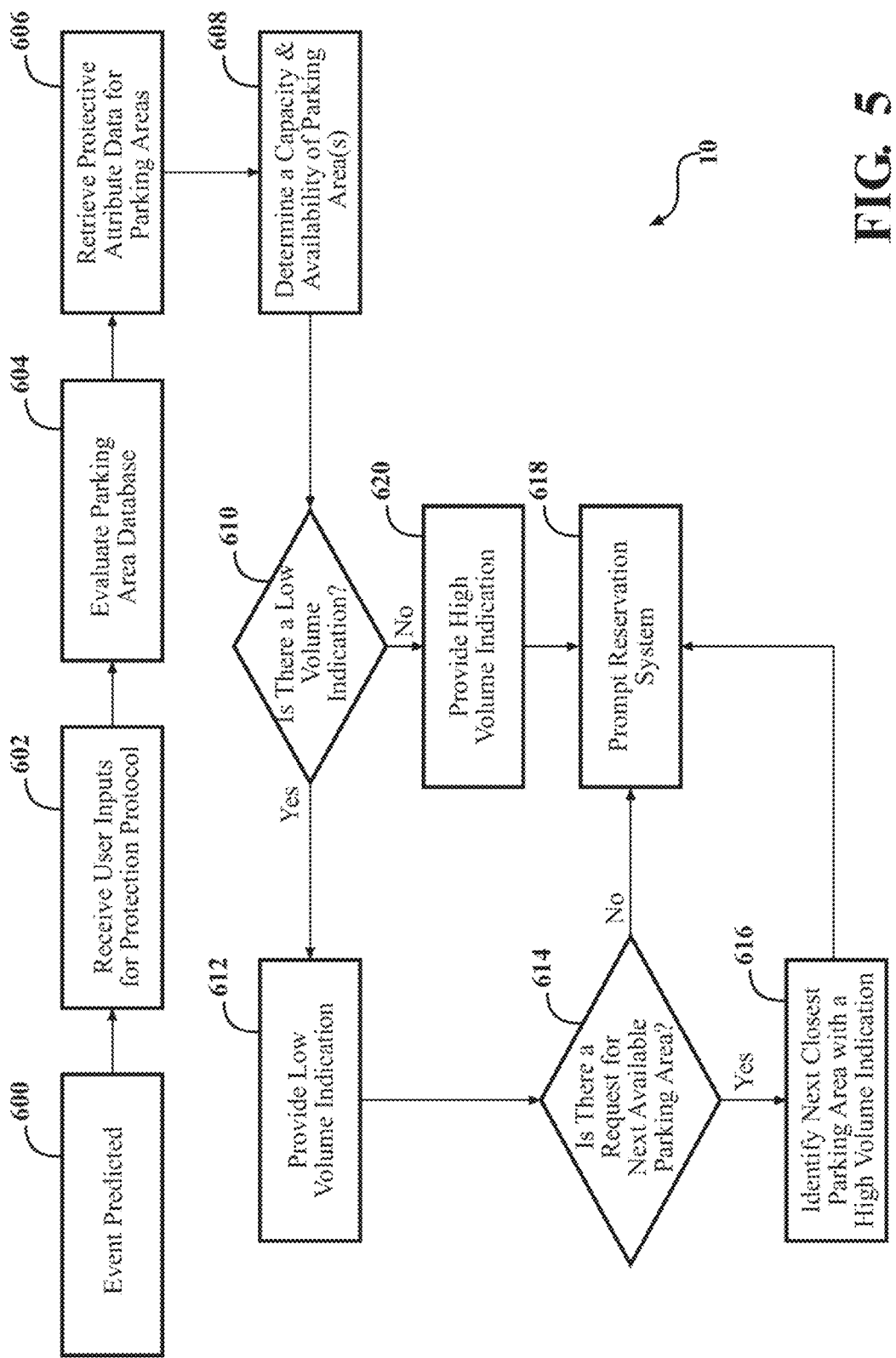
FIG. 5 is an example flow diagram for a parking protection system according to the present disclosure.

Referring now to FIG. 5, which illustrates an example flow diagram of the parking protection system 10. The event 28 is predicted, at 600. As mentioned above, the event 28 may be predicted by the third party server 300 and/or the weather application 30 on the user device 12. The back office server 100 receives, at 602, the user input(s) 202 corresponding to the protection protocol 14. The back office server 100, at 604, evaluates the parking area database 104 and retrieves, at 606, the protective attribute data 106 for the parking areas 102. The back office server 100 then evaluates the capacity data 108 and the availability data 110 to determine, at 608, the capacity and availability of the parking area(s) 102. The back office server 100 then determines whether there is a low volume indication 110a, at 610.

If there is a low volume indication 110a at the parking area 102, then the back office server 100, at 612, provides a low volume indication 110a. The parking protection system 10 may then determine, at 614, whether there is a request for a next available parking area 102. If a request is received, then the back office server 100 identifies, at 616, the next closest parking area 102 with a high volume indication 110b. If the user device 12 is equipped with the reservation system 40, then the parking protection system 10, at 618, prompts the reservation system 40. If there is no low volume indication 110a, then the back office server 100 provides, at 620, a high volume indication 110b. In response to the high volume indication 110b, the parking protection system 10 prompts, at 618, the reservation system 40.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:
predicting a weather event based on event data, the weather event comprising at least one of hail or flooding;
determining, based on the predicted event, protective attributes comprising at least one of overhead coverage or elevated parking;
receiving an input corresponding to at least one of the protective attributes;
obtaining protective attribute data in response to the received input from a database of parking areas;
determining an availability and a capacity of one or more parking areas matching the protective attribute data;
generating a low volume indication when a number of available parking spaces of the one or more parking areas is below a predetermined threshold; and
in response to generating the low volume indication:
prompting a reservation system on a user device to secure a reserved spot in one of the one or more parking areas; and
providing a route to one of the one or more parking areas based on the protective attribute data and the determined availability and capacity.

2. The method of claim 1, wherein the operations further comprise categorizing the event in a protection category, the protection category including at least one of a weather event, an outage event, and a fire event.

3. The method of claim 1, wherein determining the availability and the capacity includes determining a high volume of one or more of the parking areas and issuing, in response to the determined high volume, a high volume indication.

4. The method of claim 3, wherein providing the route includes determining the route based on the high volume indication.

5. The method of claim 1, wherein obtaining the protective attribute data includes comparing the protective attribute data with the received input corresponding to at least one of the protective attributes.

6. The method of claim 1, wherein the operations further comprise determining that a vehicle associated with the user device is an electric vehicle.

7. The method of claim 6, wherein the protective attributes further comprise at least one of an uninterruptable power source or surge protection.

8. A parking protection system comprising:
data processing hardware; and
memory hardware in communication with the data processing hardware, the memory hardware storing instructions that when executed on the data processing hardware cause the data processing hardware to perform operations comprising:
predicting a weather event based on event data, the weather event comprising at least one of hail or flooding;
determining, based on the predicted event, protective attributes comprising at least one of overhead coverage or elevated parking;
receiving an input corresponding to at least one of the protective attributes;
obtaining protective attribute data in response to the received input from a database of parking areas;
determining an availability and a capacity of one or more parking areas matching the protective attribute data;
generating a low volume indication when a number of available parking spaces of the one or more parking areas is below a predetermined threshold; and
in response to generating the low volume indication:
prompting a reservation system on a user device to secure a reserved spot in one of the one or more parking areas; and
providing a route to the one of the one or more parking areas based on the protective attributes and the determined availability and capacity.

9. The system of claim 8, wherein the operations further comprise categorizing the event in a protection category, the protection category including at least one of a weather event, an outage event, and a fire event.

10. The system of claim 8, wherein determining the availability and the capacity includes determining a high volume of one or more of the parking areas and issuing, in response to the determined high volume, a high volume indication.

11. The system of claim 10, wherein providing the route includes determining the route based on the high volume indication.

12. The system of claim 8, wherein determining the protective attributes includes comparing the protective attributes with the received input corresponding to at least one of the protective attributes.

13. The system of claim 8, wherein the operations further comprise determining that a vehicle associated with the user device is an electric vehicle.

14. The system of claim 13, wherein the protective attributes further comprise at least one of an uninterruptable power source or surge protection.

15. A parking protection system comprising:
- a back office server including a parking area database;
- a network communicatively coupled with the back office server; and
- a user device including a display and data processing hardware in communication with the display and communicatively coupled with the back office server via the network, the data processing hardware including a parking protection application configured with a protection protocol, the parking protection application being configured to:
  - predict a weather event based on event data, the weather event comprising at least one of hail or flooding; and
  - determine, based on the predicted event, protective attributes comprising at least one of overhead coverage or elevated parking; and
- the data processing hardware configured to:
  - receive an input corresponding to at least one of the protective attributes;
  - obtain protective attribute data in response to the received input from a database of parking areas;
  - determine an availability and a capacity of one or more parking areas matching the protective attribute data;
  - generate a low volume indication when a number of available parking spaces of the one or more parking areas is below a predetermined threshold; and
  - in response to generating the low volume indication:
    - prompt a reservation system on a user device to secure a reserved spot in one of the one or more parking areas; and
    - provide a route to the one of the one or more parking areas based on the protective attribute data and the determined availability and capacity.

16. The parking protection system of claim 15, wherein the parking area database includes the protective attribute data.

17. The parking protection system of claim 16, wherein the back office server is configured to compare the protective attribute data with the one or more protective attributes.

18. The parking protection system of claim 17, wherein the user device further includes a navigation application configured to execute the route to the reserved spot.

19. The parking protection system of claim 15, further including a third party server communicatively coupled to at least one of the back office server and the user device via the network, the third party server including the event data including one or more of weather data, outage data, and fire data.

20. A vehicle in communication with the parking protection system of claim 15.

\* \* \* \* \*